Dec. 1, 1970  G. C. BOYSEN  3,544,937

COIL SUPPORTING PLATES

Filed May 8, 1969  2 Sheets-Sheet 1

INVENTOR
GERD C. BOYSEN

BY

ATTORNEY

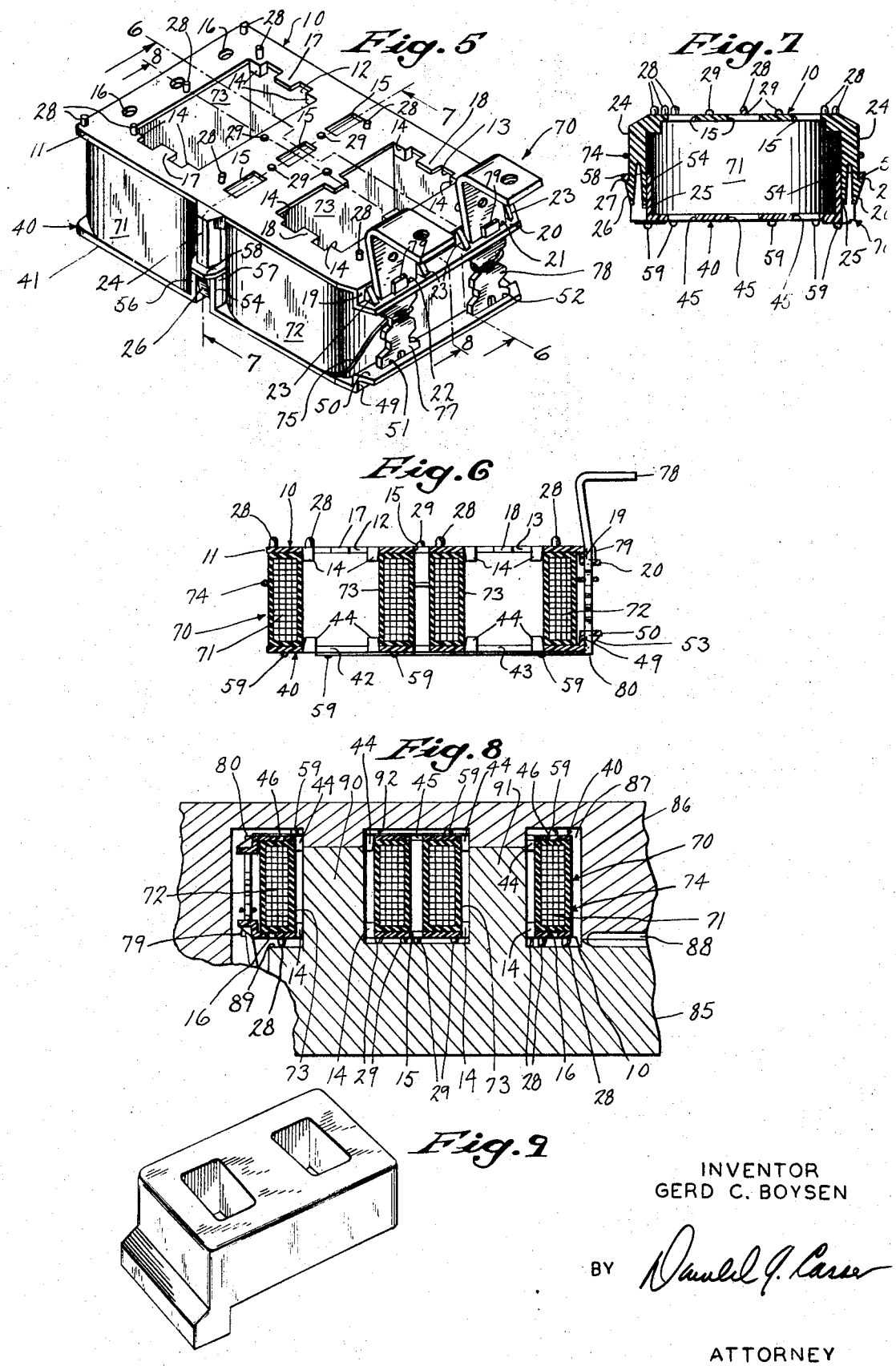

United States Patent Office 3,544,937
Patented Dec. 1, 1970

3,544,937
COIL SUPPORTING PLATES
Gerd C. Boysen, Milwaukee, Wis., assignor to Allen-Bradley Company, Milwaukee, Wis., a corporation of Wisconsin
Filed May 8, 1969, Ser. No. 823,110
Int. Cl. H01f 27/30
U.S. Cl. 336—65                     5 Claims

ABSTRACT OF THE DISCLOSURE

Cooperating supporting plates for holding electrical coils, particularly electromagnetic coils, for encapsulation which includes integral means for spacing a coil assembly in a molding die during encapsulation and means for controlling coverage of surface areas with the encapsulation material, co-acting locking means for joining together a pair of spaced supporting plates with coils positioned therebetween, and provision for the facile attachment of electrical terminals to the coil assembly.

BACKGROUND OF THE INVENTION

Field

This invention relates to the manufacture of electrical coils, more specifically to structures for holding such coils during assembly and molding operations during which the coils are covered with insulating material.

Prior art

The manufacture of electrical coil assemblies, particularly coils for use in electromagnetical assemblies, involves the arrangement of one or more coils on a supporting member, wiring the coils together in the desired electrical connection, attaching terminals to the assembly, and then molding insulating material about the coil assembly in a suitable die.

Several problems are encountered in the production of such assemblies when utilizing prior art techniques. A major problem is that of properly spacing the coil assembly within the cavity of a molding die during encapsulation to insure that the insulating material is of desired thickness about the entire assembly. A present means of accomplishing this is through the use of reciprocating support pins associated with the molding die which, after the desired quantity of resin has been supplied into the cavity, must be retracted before the plastic cures. A further problem is that of obtaining proper registration of the coil assembly relative to molding die elements to ensure the assembly is in the desired position before encapsulation. Another problem is that of facilitating the attachment of terminals that are to be electrically connected with the coils and retaining them in the desired position. A problem also encountered with some prior art techniques is that of maintaining the position of a coil or coils on a supporting plate throughout subsequent assembly and molding operations. Yet another deficiency is that typical prior art assemblies require the use of several parts, thereby complicating the assembly operations and inventory systems associated therewith, such as for example, the problems of providing for attachment of coils to a supporting plate and adding insulating material between the coils and supporting plate.

SUMMARY OF THE INVENTION

This invention has for its main objects the provision of new coil supporting plates which will obviate the difficulties experienced with prior art assemblies as noted above, and the provision of a unitary supporting plate structure which will integrate various functional requirements for an electrical coil supporting plate assembly; a more specific object is to provide the particular constructional details hereinafter described and claimed.

This invention provides a pair of spaced plates which support a coil or coils to be encapsulated between them in clamp-like fashion through the provision of interengaging locking structure associated with each supporting plate. Each plate includes integral means for spacing or locating the coil assembly in the cavity of a molding die for encapsulation, thereby eliminating the need for apparatus associated with the molding equipment to obtain the desired degree of coverage of encapsulating material about the coil assembly. The plates also include means for contacting the molding dies so as to properly position a coil assembly within a die cavity. Furthermore, the supporting plates of this invention include terminal positioning structure so that electrical terminals can be attached to the assembly after the coils are inserted therebetween and such terminal attachment can be carried out rapidly and yet provide for positive location of the terminals in their desired positions. The coil supporting plates of this invention are formed of insulating material, its presently-preferred embodiment comprising plates of molded plastic, so there is no need to add other insulating material when positioning coils on the plate as is the case when metal supporting plates are employed.

DESCRIPTION

A presently-preferred embodiment is shown in the drawings and described herein to illustrate but not limit this invention inasmuch as it is anticipated that changes can be made by those skilled in the art which will remain within the true spirit and scope of this invention.

In the drawings:

FIG. 5 is a perspective view showing the plates of FIGS. 1 and 3 assembled with a pair of wire coils held between them;

FIG. 6 is a longitudinal cross-sectional view of the assembly of FIG. 5;

FIG. 7 is a transverse cross-sectional view of the assembly of FIG. 5;

FIG. 8 is a sectional view showing the assembly of FIG. 5 in a molding die for encapsulation; and FIG. 9 is a perspective view of an encapsulated coil using the assembly of FIG. 5.

DESCRIPTION OF PREFERRED EMBODIMENTS

Figure 1:
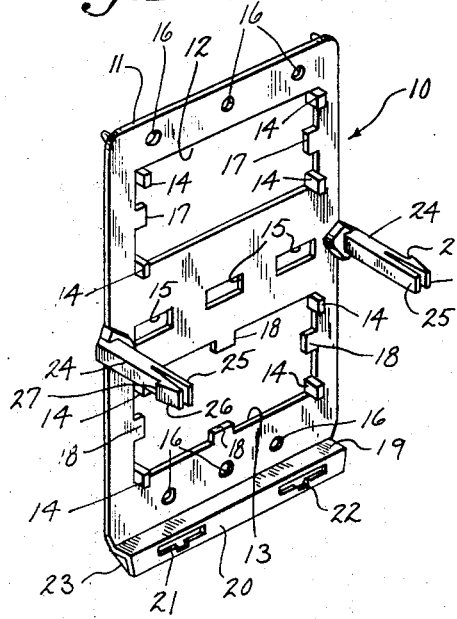
FIG. 1 is a perspective view of a coil supporting plate of this invention.
Figure 2:
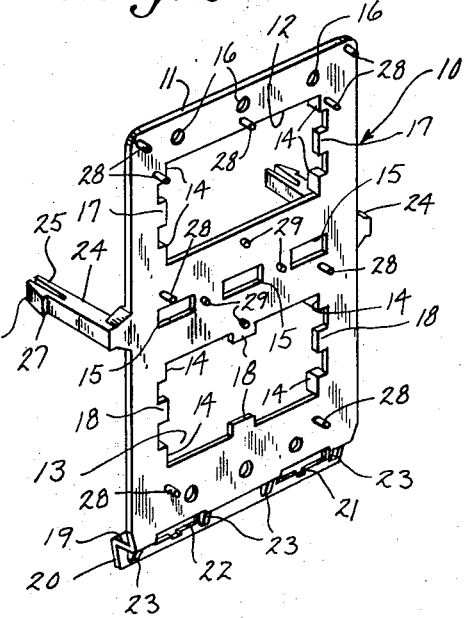
FIG. 2 is a perspective view of the opposite side of the plate shown in FIG. 1.

FIGS. 1 and 2 depict a first coil supporting plate 10 according to this invention. The plate as illustrated is designed to hold two coils (as will be discussed in detail below with reference to FIG. 5) and includes a base panel 11 in which are found core apertures 12 and 13. What is referred to herein as the inner surface of the base 11 is shown in FIG. 1 and the outer surface of the base is shown in FIG. 2. Upstanding lugs 14 which project from the inner surface of the base panel are formed as integral parts of the plate 10. There are four lugs 14 positioned about each opening 12 and 13 which are formed to engage the hollow core of each coil which will be supported on the plate. The central section of the base panel 11 includes a row of apertures 15, and each end section of the base panel includes a row of resin-flow ports 16, the purpose of which will be described below. First locating tabs 17 are formed along opposed sides of the core aperture 12 and extend partially into the aperture, and second locating tabs 18 are formed along each of the four sides of core aperture 13 and extend partly into the aperture. As one end of the plate 10, an upstanding wall 19 is formed and a terminal-retaining flange 20 that includes spaced terminal apertures 21 and 22 is joined to the wall 19. Ribs 23 interconnected the wall 19 and flange 20 to stiffen such structure.

Male locking members 24 extend from the base 11 are bifurcated along their outer ends into inner and outer arms 25 and 26 respectively, with each outer arm 26 being tapered to form a locking abutment 27 near its end.

Turning now to FIG. 2 die-contacting pins 28 and 29 project from the outer surface of the base panel of the plate 10. The die-contacting pins 28 and 29 are adapted to contact molding die surfaces when the coil assembly is to be encapsulated, as described in detail below, and the length of the pins 28 and 29 should be adjusted as necessary to obtain the desired thickness of the encapsulating coating; thus, in FIG. 2, the die-contacting pins 28 are shown as being longer than the die-contacting pins 29 in order to control the coating thickness over their respective areas.

Figure 3:
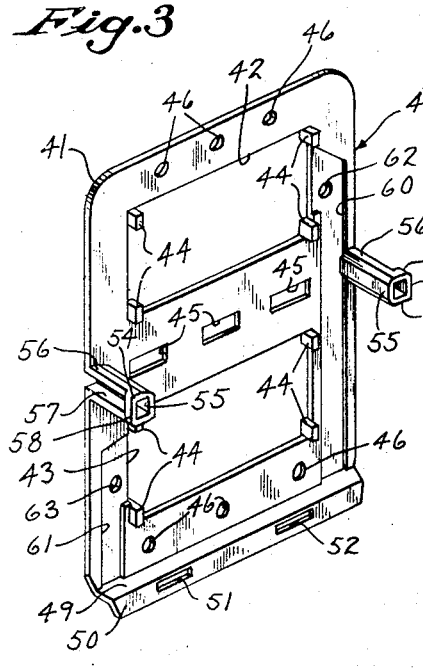
FIG. 3 is a perspective view of another supporting plate of this invention.
Figure 4:
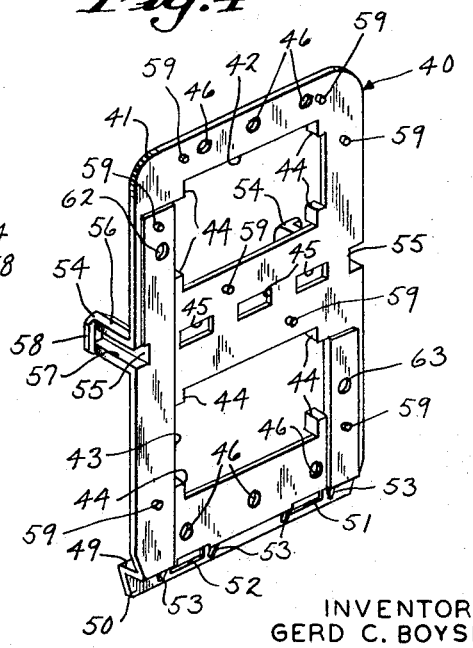
FIG. 4 is a perspective view of the opposite side of the plate of FIG. 3.

FIGS. 3 and 4 illustrate, respectively, front and rear views of a second coil supporting plate 40 according to this invention which is intended to be combined with the plate 10 in the coil assembly described below and therefore has several structural features similar to the plate 10. The plate 40 includes a base panel 41 (its inner surface being shown in FIG. 3 and its outer surface in FIG. 4) that has spaced core apertures 42 and 43 which are to be aligned with core apertures 12 and 13 respectively of plate 10, upstanding lugs 44 and square apertures 45, corresponding to lugs 14 and apertures 15, and resin-flow ports 46 corresponding to ports 16 except for the spacing as shown in the drawing. An upstanding wall 49 at one end of the base panel connects to a terminal-retaining flange 50 in which are formed terminal apertures 51 and 52, the wall 49 and flange 50 being stiffened by ribs 53.

Female locking members 54 extend from the inner surface of the base panel of the plate 40 and are designed to connect with the male locking tongues 24 of the plate 10. Each female lock member 54 includes an end wall 55 connected to spaced side wall 56 and 57 arranged to receive between them a locking tongue 24. A collar 58 extends around the outer extremities of the walls 55, 56 and 57 and is positioned to contact the abutments 27 on each locking tongue 24 in order to hold the plates 10 and 40 together.

Turning next to FIG. 4, the outer surface of the plate 40 includes die-contacting pins 59 whose function corresponds to that of the pins 28 and 29 on the plate 10. Along one side of the inner surface of the base panel of plate 40, a groove 60 extends from the upstanding wall 49 and opens onto the aperture 42, and on the opposite side of the plate, a groove 61 extends from the upstanding wall 49 to open onto the aperture 43. A resin-flow port 62 is formed in the groove 60 and a similar port 63 is formed in the groove 61.

FIGS. 5, 6 and 7 illustrate an assembly 70 formed of wire coils 71 and 72 inserted between supporting plates 10 and 40. Each coil 71 and 72 has a hollow core 73 which, as best illustrated in FIG. 6, engages the lugs 14 projecting from the plate 10 and the lugs 44 projecting from the plate 40 to position each coil relative to the plates. After the coils are placed on one plate, such as plate 10, they are electrically connected together by wires 74 and 75, in either series or parallel connections as desired, with the wires 75 lying across the top of the coils so as to be disposed within the grooves 60 and 61 when the plate 40 is placed over the coils.

When the plates 10 and plates 40 are to be connected to each other with the coils disposed between them, the locking members 24 of the plate 10 are inserted into the female locking members 54 of the plate 40 and the plates are pressed together sufficiently so that the abutments 27 on the members 24 will engage the collars 58 of the locking members 54. The two plates will then be clamped together with the bifurcated arms 25 and 26 of each locking member 24 exhibiting a slight tendency to be squeezed together slightly as they pass through the collar, the outer arms 26 being tapered to facilitate this interengagement.

Next, terminals 77 and 78 are added to the coil assembly, with the terminal 77 extending through terminal aperture 22 in the plate 10 and terminal aperture 51 in the plate 40 aligned therewith, and the terminal 78 extending through terminal aperture 21 in the plate 10 and terminal aperture 52 in the plate 40 aligned therewith. Each terminal preferably includes a shoulder 79 which abuts the terminal-receiving flange 20 of the plate 10 and the opposite end of the terminal can be formed to have arms which are slightly resilient so as to be urged together somewhat upon insertion in the apertures 51 and 52 of the terminal-receiving flange 50 of the plate 40; this will serve to positively locate the terminals and retain them in their desired position. With the terminal receiving flanges 20 and 15 being positioned inwardly of their respective plates in relation to the coil assembly 70, the outer end 80 of each terminal (see FIG. 6) can be flush with the outer surface of the plate 40.

FIG. 8 illustrates the insertion of a coil assembly 70 within a molding die comprising lower die member 85 and upper die member 86 which cooperate to define a mold cavity 87 gated at 88 for the introduction of molten encapsulating material. When the assembly 70 is placed within the lower die member 85, the die-contacting pins 28 and 29 of the plate 10 contact lower inner surfaces 89 of the lower die in the manner illustrated in the drawing so as to space the assembly from the die surfaces. The distance between the inner surface of the cavity and the plate 10 is determined by the height of the die-contacting pins 28 and 29 and, in turn, the thickness of the encapsulating coating is governed by the length of the pins. The lower die 85 includes upstanding cores 90 and 91 which extend into the hollow core areas of the coil assembly 70. In order to provide for longitudinal registration of the assembly within the lower die member, the second locating tabs 18 along the long sides of core aperture 13 (see also FIGS. 1 and 5) engaged opposite sides of the core 90. Lateral registration of the coil assembly within the die cavity is obtained by engagement of the second locating tabs 18 on the short sides of core aperture 13 and the first locating tabs 17 with the cores 90 and 91 respectively, which action is not visible in FIG. 8. The coil assembly is accurately located within the die cavity by reason of the structure of the plate 10.

At the top of the molding die, the upper die member 86 is spaced from the coil assembly 70 through contact of the die-contacting pins 59 of the plate 40 with the inner surface 92 of the upper die member. The dies are formed in any suitable manner to provide the desired molding configuration about the terminals 77 and 78.

Once the coil assembly is properly placed within the die cavity, molten encapsulating material is admitted into the cavity 87 through the gate 88 and will flow about the coil assembly to form a molded shape in accordance with the cavity design. The molten material will flow through the resin-flow ports 16 of the plate 10 and ports 46 of the plate 40 and entirely surround the coils 71 and 72 to thereby fully and electrically insulate them. If the coils are wound with paper interleaved between layers of wire, the encapsulating resin will permeate the paper between the wire layers. The principal purpose of the rectangular apertures 15 and 45 in the plates 10 and 40 respectively is to allow the flow of molten resin between the coils. The die members are shown in a simplified form in FIG. 8, it being understood they may have any desired shape. The encapsulating material can be any suitable composition, with epoxy compounds capable of being molded at relatively low pressures being preferred, and the material is to be an electrically insulating material. After the proper amount of material has been admitted into the die cavity, its flow is interrupted and it is allowed to cure in accordance with its particular characteristics.

A completed coil assembly after encapsulation is shown in FIG. 9, it being understood that the encapsulated coils may include other external elements molded simultaneously with encapsulation if such are necessary for the particular apparatus in which the coil is to be used.

It has been found that the use of the coil supporting plates according to this invention simplifies the molding procedure during encapsulation because it eliminates the need for mechanical elements associated with the dies to locate the coil assembly in relation to the die cavity. This function is now performed by the die contacting pins formed integral with the supporting plates. While various types of material are suitable for the supporting plates 10 and 40, they should be made of an insulating material for most applications and thermoplastics which will allow convenient molding of the plates with their various elements are preferred, glass filled nylon having proved especially useful. An integral molding providing the various structural features of the plates of this invention has the advantages of a reduction in the number of parts and elimination of assembly operations in order to provide a satisfactory coil supporting plate. If the plates are made of an electrically insulating material, there is no need to add additional insulating elements between the coils and supporting plates during formation of a coil assembly 70.

Although the coil supporting plates of this invention have been illustrated with reference to an assembly comprising a pair of electromagnetic coils, they can also be utilized with other types and styles of electrical coils. For example, they may be used with a single coil instead of the two shown in the drawings, in which event the central section of each plate and the rectangular apertures can be omitted and the co-acting locking means on the respective plates can be formed along the end of each plate opposite from the terminal-retaining flanges instead of at the sides as shown in the present drawings.

I claim:

1. In a coil assembly including at least one electrical coil having a hollow core, terminals electrically connected thereto, and supportng means for each coil, which assembly is to be inserted in a molding die cavity for encapsulation with insulation material, the improvement wherein:
    the supporting means comprises a pair of superposed spaced coil supporting plates, and the plates include:
    (1) a base panel having a core aperture for each coil to be supported thereon, an aperture in one plate being in alignment with an aperture in the other plate and arranged for disposition within the hollow core of each coil;
    (2) locating tabs on at least one of the plates, the locating tabs extending into a core aperture and adapted for contact with a molding die element inserted therethrough;
    (3) die contacting means extending from at least one surface of the base panel of each plate and adapted for contact with a molding die element surrounding the plate to thereby control the thickness of insulating material along each said one surface;
    (4) locking means attached to the base panel of each plate including a first locking element on one of the plates and a second co-acting element on the other plate, the locking means being adapted to hold the plates together for clamping each such coil therebetween.

2. A coil assembly according to claim 1, wherein:
   each supporting plate further includes a terminal-retaining flange along at least one end of each plate, the terminal-retaining flanges being aligned with each other and adapted for retention of terminals therebetween.

3. A coil assembly according to claim 2, wherein:
   the terminal-retaining flange of each plate is spaced from the base panel of each plate and further includes wall means connecting each terminal-retaining flange to the base panel of its respective plate.

4. A coil assembly according to claim 1, wherein:
   each supporting plate is formed of plastic electrically insulating material, and the locating tabs, die contacting means and locking means are integral with the base panel.

5. A coil assembly according to claim 1, wherein:
   the first locking element of the locking means comprises a pair of spaced locking arms attached to one supporting plate, each arm having a bifurcated end and a tapered portion leading to an abutment, and
   the second co-acting element comprises wall portions within which the aforesaid locking arms are received, and a collar portion adapted to contact the abutment on each of the locking arms to thereby hold the plates together when a coil is inserted therebetween.

References Cited

UNITED STATES PATENTS

| 3,092,797 | 6/1963 | Wood | 336—198 |
| 3,243,752 | 3/1966 | Lawrence | 336—96X |

FOREIGN PATENTS

| 586,621 | 1947 | Great Britain | 336—65 |

THOMAS J. KOZMA, Primary Examiner

U.S. Cl. X.R.

336—96, 192, 208